United States Patent

[11] 3,630,630

| [72] | Inventor | Bengt Ebbe Harald Nyman<br>Rockford, Ill. |
|------|----------|------------------------------------------|
| [21] | Appl. No. | 854,939 |
| [22] | Filed | Sept. 3, 1969 |
| [45] | Patented | Dec. 28, 1971 |
| [73] | Assignee | Atlas Copco Aktiebolag<br>Nacka, Sweden |
| [32] | Priority | Sept. 10, 1968 |
| [33] | | Sweden |
| [31] | | 12126/68 |

[54] POWER-OPERATED THREAD-CUTTING UNITS
7 Claims, 6 Drawing Figs.

[52] U.S. Cl. ........................................... 408/9,
10/139, 408/130
[51] Int. Cl. ............................................ B23g 1/00
[50] Field of Search ................................ 10/89 F, 89
H, 105, 139, 136; 77/32.7, 33.3; 408/9, 130, 702

[56] References Cited
UNITED STATES PATENTS

| 2,459,902 | 1/1949 | Tucker | 408/130 |
| 2,724,134 | 11/1955 | Perlotto | 408/130 |
| 2,854,871 | 10/1958 | Stratman | 408/130 |
| 3,200,426 | 8/1965 | Barr | 408/9 |
| 3,266,580 | 8/1966 | Clapp et al. | 408/9 |
| 1,381,197 | 6/1921 | John | 10/89 |
| 3,052,011 | 9/1962 | Brainard et al. | 10/139 |
| 3,273,182 | 9/1966 | McDonald | 10/139 |
| 3,336,821 | 8/1967 | Firth | 10/139 |
| 3,461,472 | 8/1969 | Sedgwick et al. | 10/139 |
| 3,487,730 | 1/1970 | Dohring et al. | 77/32.7 |

FOREIGN PATENTS

| 1,084,455 | 9/1967 | Great Britain | 408/9 |

*Primary Examiner*—Charles W. Lanham
*Assistant Examiner*—E. W. Combs
*Attorney*—Bauer and Goodman

ABSTRACT: To provide a simple, compact thread-cutting unit, pressure fluid power means effect axial movement of a thread-cutting tap. The tap is driven by a fluid motor, the rotary speed of which is automatically adapted to the axial feed by controlling the back pressure on the motor, that is, by more or less throttling the exhaust from the motor under control of axial movement of the spindle carrying the tap, independent of the axial feed.

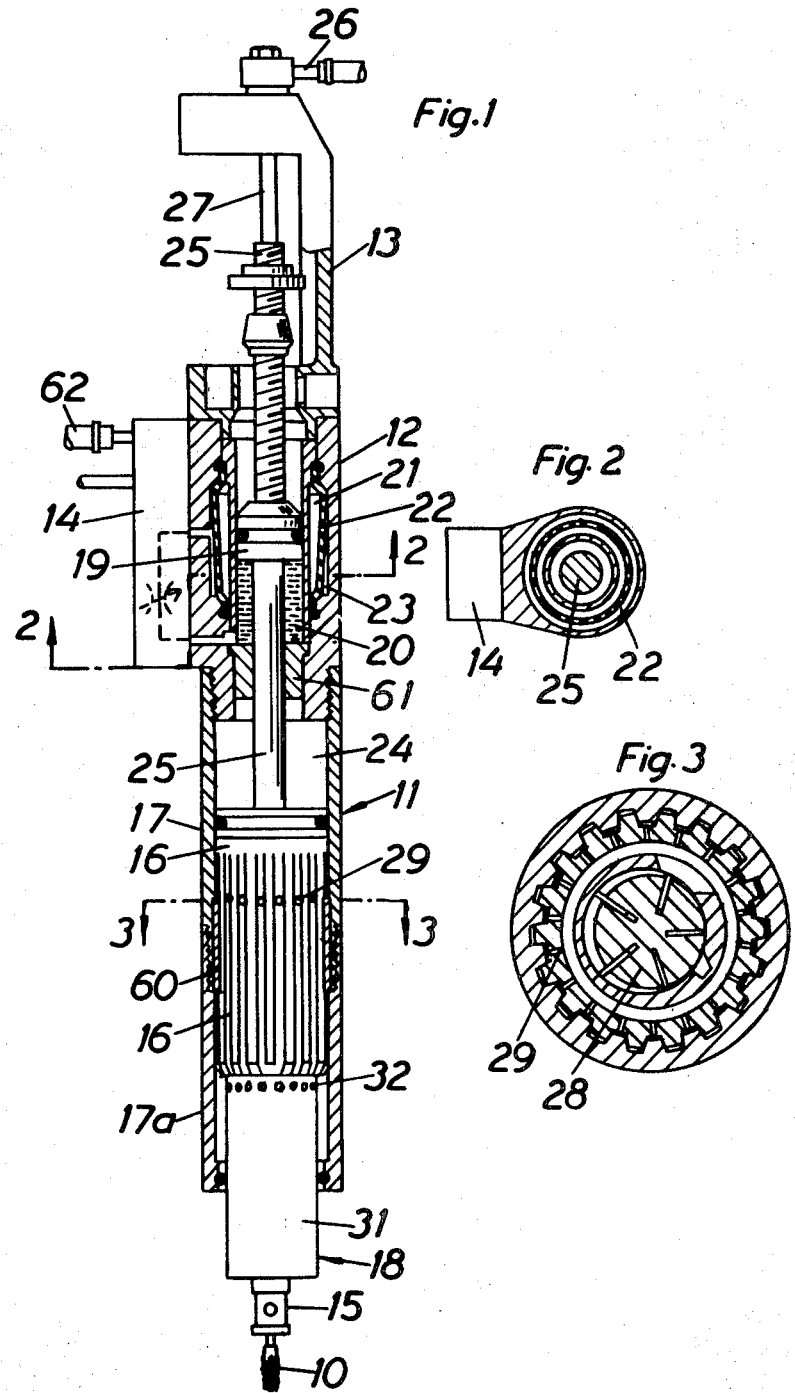

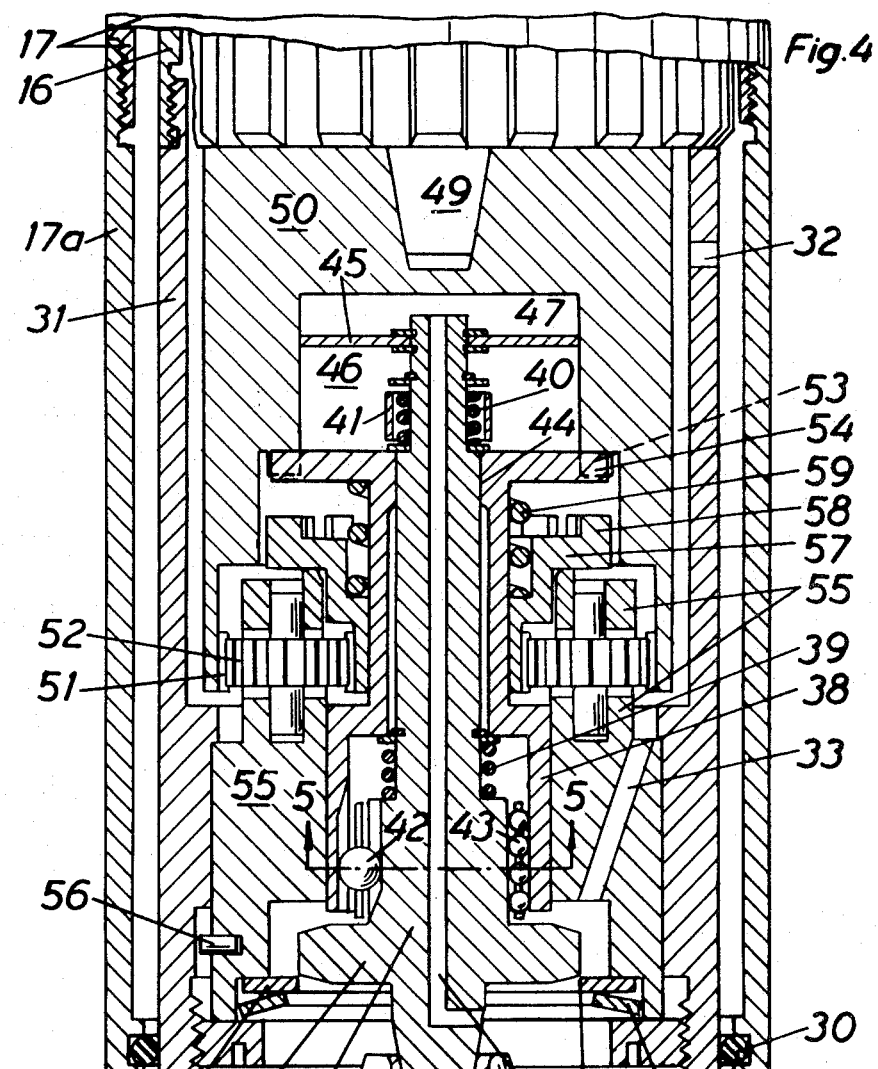

POWER-OPERATED THREAD-CUTTING UNITS

This invention relates thread-cutting units of the type provided with power means for feeding and retracting a tool holder for a thread-cutting tool element.

It is a main object of the invention to provide a versatile thread-cutting unit of the type mentioned, in connection with which the tool element does not exert harmful axial load on the workpiece and the threads in the workpiece. A more specific object is to provide such a thread-cutting unit in which the rotary speed of a motor for rotating a holder for the tool element is adapted automatically and continuously to the combination of the pitch of the tool element and the axial speed.

SUBJECT MATTER OF THE INVENTION

For these and other objects, I provide a power-operated thread-cutting unit comprising a first part adapted to be mounted in a frame or the like, a second part movably carried by said first part, a tool holder for a thread-cutting tool element carried by said second part with a limited axial movability thereto, a fluid-operated motor for rotating said tool holder, means for feeding and retracting said second part with a controlled axial speed, and means to control the rotary speed of said motor in response to the relative axial position between the tool holder and said second part by control of the back pressure on the motor so as to adapt the axial speed of the cutting tool to the axial speed of said second part.

The above and other objects of the invention are obvious from the following description and the accompanying drawings, in which an embodiment of the invention is illustrated by way of example. It is to be understood that various modifications may be made within the scope of the claims.

In the drawings:

FIG. 1 is a longitudinal view, partly in cross section;

FIG. 2 is a section on line 2—2 in FIG. 1;

FIG. 3 is a section on line 3—3 in FIG. 1;

FIG. 4 is a longitudinal section through the forward portion of the thread-cutting unit in FIG. 1;

FIG. 5 is a section on line 5—5 in FIG. 4;

FIG. 6 shows a different relative position between some details shown in FIG. 4.

In the unit illustrated in the drawings, a stationary part 11 carries an axially movable part 16, 18, 19, 25, which carries and rotates a tool holder or chuck 15 for a thread-cutting tool element illustrated as a tap 10. The stationary part 11 comprises: a forward portion in the form of a cylinder 17, 17a, which is to be fixed to a nonillustrated frame which may support a number of units; an intermediate portion 12 with a cylinder 20 and a detachable valve block 14; and a back head 13. The movable part comprises: a housing 16 for a rotary motor and gearing, the rear portion of this housing constituting a feed piston which is slidable in the cylinder 17; an adapter 18 for thread cutting; and a piston rod 25 of the feed piston carrying a return piston 19 which is slidable in the cylinder 20. The piston rod 25 is slidingly sealed against a bushing 61 which defines end parts of the cylinders 17 and 20. Rotation between the movable part 16, 18, 19, 25 and the stationary part 11 is prevented by means of external splines on the housing 16 mating with internal splines in a sleeve 60 fixed to the cylinder 17.

A nonillustrated air-distributing valve in the valve block 14 is connected to a source of compressed air by means of a main conduit 62. It has a position for effecting feed motion in which position it supplies compressed air to a chamber 24 in the cylinder 17 and simultaneously vents an annular air chamber 21 which, by means of an elastic membrane 22, is separated from an annular hydraulic fluid reservoir 23. The cylinder 20 is filled with a hydraulic fluid and, during feed motion effected as described, the return piston 19 forces the hydraulic fluid into the hydraulic fluid reservoir 23 via a control system of valves and channels in the valve block 14. This control system is indicated fragmentarily by dashlines in FIG. 1.

Retraction is effected when, alternatively, compressed air is supplied via the air-distributing valve to the air chamber 21 and the air chamber 24 is vented. Hydraulic fluid is now forced from the reservoir 23 to the cylinder 20 and, thus, the return piston 19 retracts the movable part 16, 18, 25 of which it is an integral part. The valve block 14 incorporates valves by which the hydraulic fluid flow may be adjusted. By this arrangement with a hydraulic control system, a very precise adjustment of the speed of feed motion and retraction is possible. The retraction may be effected with a higher speed than the feed motion.

A feed motion starts normally with a high-speed approach feed which transforms into a slow-speed working feed just before the tap 10 reaches a workpiece 9. This transformation into the working feed may also be initiated by the engagement of the tap 10 with the workpiece 9.

The motor in the housing 16 is a sliding vane rotary motor 28 which is supplied with compressed air through a longitudinal channel in the piston rod 25. The air is supplied to the piston rod 25 by means of a hose fitting 26, a nonillustrated channel in the back head 13, and a pipe 27. This pipe 27 is fixed to the back head and inserted in and slidingly sealed by suitable sealing means (not illustrated) to the channel in the piston rod 25.

The forward portion 17a of the cylinder 17 and the adapter 18 for thread cutting can be removed and a chuck for a drill be mounted on a spindle 49 projecting from the housing 16 and driven by the motor 28.

Spent air from the rotary motor 28 flows through exhaust ports 29 in the housing 16 and follows the splines thereof. The forward portion 17a of the cylinder 17 has sealing rings 30 which seal against the housing 31 of the adapter 18. Therefore the spent air is forced into the adapter 18 through holes 32 in the housing 3 (FIG. 4) and then through a number of passages 33 to a restricting gap 34 between a ring 35 and an annular flange 37. Thus, the ring 35 and the flange 37 provide a throttling valve which controls the speed of the rotary motor 28. The ring 35 is clamped axially by means of a Belleville spring washer 63 and is held radially only by friction forces. The flange 37 is an integral part of a spindle 36 which carries the chuck 15. A clutching sleeve 38 is biased axially towards a normal position by means of a spring 59. The spindle 36 is resiliently carried by the clutching sleeve 38 by means of weak springs 39, 40. A stop sleeve is arranged to limit the axial movability between the spindle 36 and the clutching sleeve 38. Torque is is transmitted from the clutching sleeve 38 to the spindle 36 via a ball 42 rolling in longitudinal slots in the sleeve 38 as well as in the spindle 36. This arrangement will permit axial movement between the spindle 36 and the clutching sleeve 38 almost without any axial friction with torque being transmitted simultaneously.

The spindle 36 is journaled on the clutching sleeve 38 by means of other balls 43 and by means of a sliding bearing at 44. For balancing the static forces exerted upon the spindle 36 and its flange 37 by the pressure of the spent air still under pressure because restricted, there is a counteracting piston 45 attached to the back portion of the spindle 36. An air chamber 46 is under the pressure of the spent air while air leaking past the piston 45 to another air chamber 47 in back of the piston 45 is passing through a channel 48 in the spindle 36 so that there is atmospheric pressure in the air chamber 47.

With the adapter 18 mounted, this spindle 49 drives a driving member 50, which has a ring gear 51 continuously meshing with planets 52. The driving member also has dogs 53 adapted to mesh with corresponding dogs 54 of the clutching sleeve 38. The planets 52 are carried by a planet carrier 55 which is fixed axially to the housing 31 of the adapter 18 and is prevented from rotating by means of locking pins 56. The surfaces between the planet carrier 55 and the clutching sleeve 38 form a sliding bearing. The planets 52 mesh internally with a sun gear sleeve 57 which has dogs 58 with which the dogs 54 of the clutching sleeve 38 can alternatively be engaged.

The action of the adapter 18 will now be described. With the adapter 18 in idling condition, the spring 59, which cannot be compressed as easily as the spring 40, holds the dogs 54 of the clutching sleeve 38 normally in engagement with the dogs 53 of the driving member 50, as shown in FIG. 4, so that the clutching sleeve 38 is rotated. In turn, the clutching sleeve 38 rotates the spindle 36 via the ball 42. Simultaneously, the planets 52 cause the sun gear sleeve 57 to rotate. The latter can rotate freely since its dogs 58 are out of engagement. By means of the springs 39, 40, the spindle 36 is held in a normal axis position, in which the flange 37 restricts the exhaust of the rotary motor 28. Therefore, the motor rotates very slowly or does not rotate at all. When, during advance, the tap 10 is retarded upon engagement with the workpiece 9, the gap 34 is widened due to contraction of the spring 39. As a consequence, the rotary speed increases and thread cutting starts. If, during thread cutting, the tap 10 tends to pull the spindle 36 forwards with a speed exceeding the feed speed produced by the action of the feed piston 16, the spring 40 is compressed and the gap 34 becomes narrower, which results in a reduced rotary speed.

The feed motion is switched to a retraction either automatically or manually, when the desired depth of the threads is reached. The result is that the spring 40 is compressed as much as the stop sleeve 41 permits, and rotation is stopped or slowed down. Now, the spring 59 is compressed so that the dogs 53 of the driving member 50 will be pulled out of engagement with the clutching sleeve 38 since the driving member 50 is under retraction as is the housing 31. The dogs 58 of the sn gear sleeve 57 will now engage with the dogs 54 of the clutching sleeve 38. Thus, this shift takes place while the ring 35 passes the flange 37 and the motor runs very slowly. Since the planet carrier 55 is fixed, the sun gear sleeve 57 is rotated via the planets 52. This rotation of the sun gear sleeve 57 is, thus, counter to and faster than the rotation of the driving member 50. During retraction, this rotation of the sun gear sleeve 57 is transmitted via the dogs 54–58 to the spindle 36.

After the shift, the gap 34 is in back of the flange 37, as illustrated in FIG. 6. Due to some delay in the response of the motor, just after the shift, the gap 34 may be wider than what corresponds to the retraction speed of the movable part 16, 18, 25. The result will be that when the tap 10, so to say, has caught up with the movable part including the adapter 18, the relative position between the spindle 36 and the clutching sleeve 38 will have changed so that the spring 40 is not fully compressed to stop. Since the torque is considerably smaller during retraction than during thread cutting, there are smaller axial friction forces as well, and some sliding in the dog clutch 54–58 may, therefore, occur instead of one of the springs 39, 40 being contracted or lengthened. If it is desirable that such axial sliding be prevented, the dogs 54, 58 can be carried out with, for instance, tapered or rifled engaging surfaces. It is, however, probable that the power of the spring 59 cannot overcome the friction in the dog clutch 54, 58. This notwithstanding, the rotation will be controlled also during retraction owing to the gap 34 being varied. As soon as the tap 10 leaves the workpiece 9, the spring 59 forces the clutching sleeve 38 to take up its position for transmitting torque directly from the driving member 50 to the spindle 36, and the adapter 18 is ready for a new cycle of thread cutting.

When the thread-cutting unit, above described, is in use, the threads cannot be stressed by axial forces great enough to influence the quality of the threads, because the maximum axial force comprises only the weight of the tap 10, the chuck 15 and the spindle 36, and the power of one of the weak springs 39, 40.

Since the rotary speed is always adapted to the combination of the pitch of the thread-cutting tool and the axial speed of the movable part 16, 18, 25, there may be used different thread-cutting tool elements without there being need for individual adjusting of the axial speed to each tool element.

The invention is not limited to the embodiment described, but may be varied within the scope of the claims.

I claim:

1. In a pressure fluid actuated thread-cutting unit, a stationary part;
   a movable part part to be fed and retracted by pressure fluid with controlled axial speed relative to the stationary part;
   a pressure fluid actuated rotary motor;
   duct means conducting pressure fluid to and from said motor;
   a rotatable output spindle driven by the motor and adapted to hold a tool holder for a thread-cutting tool thereon;
   and resilient means supporting the spindle axially floatingly in the second part for limited axial movement,
   wherein the improvement comprises
   cooperating throttle valve members on said spindle and said movable part, the duct means conducting fluid leading through said throttle valve members to control the rotary speed of the motor by controlling the pressure thereon in response to the relative axial position between the spindle and the movable part and thereby adapt the rotary speed of the cutting tap to the axial feeding speed of the movable part.

2. A thread-cutting unit according to claim 1 in which said throttle valve member on the movable part has a circular opening, and said cooperating throttle valve member is a circular flange on the spindle.

3. A thread-cutting unit according to claim 2 in which said throttle valve member on the movable part is a ring, and spring means clamping the ring axially frictionally and radially adjustable to the movable part.

4. A thread-cutting unit according to claim 2 in which said spindle has a tool holder engageable end and an inner end, a piston on the spindle at the inner end thereof, a cylinder chamber in said movable part for housing said piston and divided thereby into an end chamber opposite to said tool holder and an annular chamber around said spindle connected to said passage means, and a channel in said spindle connecting said end chamber to the surrounding atmosphere whereby fluid pressure acting on said flange is counteracted by fluid pressure acting in said annular chamber against said piston.

5. A thread cutting-unit according to claim 1 including a clutching sleeve floatingly supporting the spindle, the clutching sleeve being rotatably journaled in said movable part and having a first axial position in which said flange forms a throttling gap with said circular opening outwardly thereof and a second axial position in which said flange forms a throttling gap with the circular opening opening rearwardly thereof, and gear transmission means between said motor and said clutching sleeve for rotating said clutching sleeve in opposite directions in respectively said first and second position thereof.

6. A thread-cutting unit according to claim 5 in which spring means are provided for biasing said clutching sleeve to the first position thereof.

7. A thread-cutting unit according to claim 1, wherein the cooperating throttle valve members are located in the duct means leading spent pressure fluid from said motor to control the rotary speed of the motor by controlling the back pressure thereon in response to relative axial position between the spindle and the movable part.

* * * * *

UNITED STATES PATENT OFFICE
CERTIFICATE OF CORRECTION

Patent No. 3,630,630              Dated December 28, 1971

Inventor(s)    BENGT EBBE HARALD NYMANN

It is certified that error appears in the above-identified patent and that said Letters Patent are hereby corrected as shown below:

Column 4, line 11, delete "part" second occurrence and insert --adapted--.

Signed and sealed this 4th day of July 1972.

(SEAL)
Attest:

EDWARD M. FLETCHER, JR.           ROBERT GOTTSCHALK
Attesting Officer                Commissioner of Patents